United States Patent
Jacumet

(10) Patent No.: US 8,130,283 B2
(45) Date of Patent: Mar. 6, 2012

(54) METHOD FOR MONITORING SET PARAMETERS OF A MOTION-PICTURE CAMERA

(75) Inventor: Klaus Jacumet, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 574 days.

(21) Appl. No.: 12/087,373

(22) PCT Filed: Jan. 3, 2007

(86) PCT No.: PCT/EP2007/000152
§ 371 (c)(1),
(2), (4) Date: Sep. 2, 2008

(87) PCT Pub. No.: WO2007/077225
PCT Pub. Date: Jul. 12, 2007

(65) Prior Publication Data
US 2009/0002495 A1      Jan. 1, 2009

(30) Foreign Application Priority Data
Jan. 4, 2006   (WO) ................ PCT/DE2006/000014

(51) Int. Cl.
*H04N 9/73* (2006.01)
(52) U.S. Cl. .................... 348/223.1; 348/335; 348/340; 348/224.1; 348/362
(58) Field of Classification Search ............... 348/222.1, 348/335, 340, 362–364, 220.1, 221.1, 223.1, 348/224.1
See application file for complete search history.

(56) References Cited

U.S. PATENT DOCUMENTS

| | | | |
|---|---|---|---|
| 4,769,699 | A | 9/1988 | Gebauer et al. |
| 4,928,171 | A | 5/1990 | Kline |
| 6,161,933 | A | 12/2000 | Tschida et al. |
| 6,353,461 | B1 | 3/2002 | Shore et al. |

(Continued)

FOREIGN PATENT DOCUMENTS

DE      103 01 714 A1    7/2004

(Continued)

OTHER PUBLICATIONS

International Search Report, dated Apr. 5, 2007, corresponding to PCT/EP2007/000152.

(Continued)

*Primary Examiner* — Yogesh Aggarwal
(74) *Attorney, Agent, or Firm* — Christie, Parker & Hale, LLP

(57) ABSTRACT

A method for monitoring set parameters of a motion-picture camera is provided. Film images, which are extracted from a recording beam path of the motion-picture camera and which are converted into digital assist signals by an optoelectronic transducer are arranged in an assist beam path of the motion-picture camera. Digital assist signals are output to a processing unit with an image frequency matching the image recording frequency of the motion-picture camera or with an assist image frequency, to which processing unit recording, control and/or status signals of the motion-picture camera or of devices connected to the motion-picture camera are additionally fed as metadata. The processing unit analyzes digital assist images composed of the digital assist signals and outputs digital output data and control signals to control modules of the motion-picture camera and/or to a network, and/or as analog or digital video signals to a monitor connected to the processing unit.

33 Claims, 5 Drawing Sheets

U.S. PATENT DOCUMENTS

| | | |
|---|---|---|
| 2002/0080257 A1 | 6/2002 | Blank |
| 2004/0085445 A1 | 5/2004 | Park |
| 2006/0125931 A1* | 6/2006 | Jacumet .................... 348/222.1 |

FOREIGN PATENT DOCUMENTS

| | | |
|---|---|---|
| EP | 0 162 311 A2 | 11/1985 |
| EP | 0 884 895 A2 | 12/1998 |
| EP | 0 910 814 B1 | 4/1999 |
| EP | 1 555 558 A1 | 7/2005 |
| EP | 1 603 328 A2 | 12/2005 |
| WO | WO 96/31050 | 10/1996 |
| WO | WO 98/57251 | 12/1998 |
| WO | WO 99/65238 | 12/1999 |

OTHER PUBLICATIONS

Cinelogic, "Cinelog Digital Video Assist Software," Mar. 15, 2006, pp. 1-9, XP-002372608, URL:http://web.archive.org/web/20020205062357/http://videoassist.com/software.htm.

German Examination Report dated Sep. 14, 2005 for parallel German Patent application No. 10 2005 001 652.9-31, 4 pages.

English translation of International Preliminary Report on Patentability dated Sep. 12, 2008 for corresponding International application No. PCT/EP2007/000152.

* cited by examiner

METHOD FOR MONITORING SET PARAMETERS OF A MOTION-PICTURE CAMERA

CROSS-REFERENCE TO A RELATED APPLICATION

This application is a National Phase Patent Application of International Patent Application Number PCT/EP2007/000152, filed on Jan. 3, 2007, which claims priority of International Patent Application Number PCT/DE2006/000014, filed on Jan. 4, 2006.

BACKGROUND

The invention relates to a method for monitoring set parameters of a motion-picture camera, and to an apparatus for carrying out the method.

DE 103 01 714 A1 discloses a method for processing film images that are extracted from a film recording beam path of a motion-picture camera and are fed to an image sensor. The image sensor is arranged in an assist beam path of the motion-picture camera, said assist beam path being interrupted periodically depending on the image recording frequency of the motion-picture camera, converts the film images into digital assist signals and outputs them to a data processing device with an image frequency matching the image recording frequency of the motion-picture camera. The data processing device processes assist images derived from the digital assist signals with the image recording frequency of the motion-picture camera and outputs the digital assist signals for display of the assist images with an assist image frequency or the image recording frequency of the motion-picture camera to a digital storage device or for display of the assist images with a normalized image frequency, for example 24 images/s, to a monitor.

A video assist system disclosed in U.S. Pat. No. 4,928,171 for eliminating or reducing the image flicker that results from the periodic interruption of the recording beam path of the motion-picture camera depending on the image recording frequency of the motion-picture camera controls the video image sensor in a light-sensitive manner only when light is available in the video beam path, and stores the video signals of the video image sensor at the frequency of the video image sensor in a buffer memory. The video signals are read out from the latter with a standard-conforming video signal frequency, such that, independently of the film transport speed or image recording frequency of the motion-picture camera, the video output signal corresponds to the standard-conforming video image frequency and therefore does not deal with the peculiarities in the exposure of a motion-picture film.

By contrast, the method disclosed in DE 103 01 714 A1 enables film images extracted from a film recording beam path of a motion-picture camera to be processed in a manner adapted to the peculiarities of a motion-picture camera. In this case, for standard-conforming conditioning of the video signals for flicker-free representation of video frames or video fields, a digital assist image is generated in parallel with each film image and is recorded in real time, that is to say at the film transport speed of the motion-picture camera, and can be represented in real time or any other viewing speed. This ensures an entirely satisfactory representation of special effects generated by the motion-picture camera, such as slow-motion and quick-motion recordings.

In further video assist devices disclosed in the prior art, such as, for example, the video assist control system for a plurality of cameras that is disclosed in U.S. Pat. No. 6,353, 461 B1, the data transmission from the camera or cameras is effected in analog fashion as a standard video signal, which later is digitized in a computer, so that no digital assist signals are generated in this case. Consequently, the resolution is fixed at the resolution defined in standard video of, for example, 624 lines in standard PAL video and slow-motion and quick-motion effects cannot be cleanly processed and represented.

SUMMARY

It is an object of the present invention to use the video assist also for monitoring or checking set parameters of the motion-picture camera or the camera lens, in particular focus and exposure settings.

The method according to an exemplary embodiment of the invention makes it possible to monitor or check set parameters of the motion-picture camera or the camera lens, in particular focus and exposure settings, with the aid of the video assist and to comply with desired or optimum set values.

With the exemplary solution according to an exemplary embodiment of the invention, the digital assist signals and digital assist images and assist image sequences are processed and/or stored in the digital domain, so that no analog/digital or digital/analog conversion is required for monitoring or checking the set parameters of the motion-picture camera or the camera lens and, accordingly, the driving of servomotors for the focus and the camera lens diaphragm or for the film transport can be effected digitally.

In this case, the exemplary solution according to the invention is based on the concept of analyzing and representing the digital assist images composed of the digital assist signals in electronic data processing devices using the means of EDP, and of using them for the analysis and/or control of camera functions and also functions of devices connected to the motion-picture camera.

The processing unit may comprise a personal computer or a recording unit. The metadata are in particular recording, control and/or status signals of the motion-picture camera and devices connected to the motion-picture camera, such as lens control devices, monitoring devices for film cartridges, sensor data for the position and inclination of the camera and the like.

For the focusing of the film images by means of image analysis and image evaluation, the frequency distribution in the digital assist images that are composed of the digital assist signals and reproduce the film images is analyzed during a variation of the focusing of the camera lens, the proportion of high frequencies in the different focus settings is determined and the focus of the camera lens is set to a value at which a digital assist image has a maximum of high frequencies.

Since the image processing is carried out at a digital level, a passive autofocus system with contrast measurement is used for an automatic image sharpness setting since the assist images recorded for contrast assessment are made available anyway by the optoelectronic transducer. In this case, the processor contained in the processing unit calculates the frequency distribution in the image and determines from the proportion of high frequencies the image sharpness, which can either be displayed numerically or graphically on a monitor or be used for the automatic focusing of the camera lens.

Exemplary, the camera lens is adjusted over a focusing range and the assist images are coupled to the metadata of each focus setting, the energy of the high frequency bands of each assist image is determined, the determined values are stored temporarily and compared with one another for each focus setting and the focus of the camera lens is set to a value at which the energy of the high frequency bands of the assist image is maximal.

The area to be brought into focus in the image, e.g. an actor's face, is marked on the processing device for example by drawing a frame around the relevant object. The image analysis takes place only within the area indicated.

As an alternative, the energy of the high frequency bands of each assist image is determined and the determined values are represented numerically or graphically preferably in the form of a moving bar on a monitor connected to the processing unit.

In this case, the adjustment of the lens can exemplary be effected by motor, but it is also possible for the user to go over the area and perform the focusing to maximum sharpness values manually.

The image sensor exemplary has the same dimensions as the image format of the motion-picture film.

Particularly if no ground glass screen is arranged in the beam path of the video assist, an image sensor matching the image format of the motion-picture film makes it possible to represent the same depth of field both on the motion-picture film and on the video images. Furthermore, an image sensor having a sensor area which is larger than the sensor area of customary image sensors enables electronic image position adjustment that makes it possible to alter the coordinates of the video image without the image sensor itself having to be mechanically adjusted.

Furthermore, it is possible to check the exposure of the entire or specific areas in a digital assist image by analyzing the brightness of the digital assist images that are composed of the digital assist signals and correspond to the film images taking account of the brightness relationship between the film images and the digital assist images, by comparing the brightness of the pixels of the assist images with at least one predetermined limit value and outputting an over- or underexposure signal if the pixels of an image area of the digital assist images overshoot or undershoot the predetermined limit value or values, the assist images preferably being converted into black/white images and the brightness of the pixels of the assist images being analyzed.

Given a known transfer function of the brightness in the assist beam path and a known sensitivity of the optoelectronic transducer and of the film used in the motion-picture camera, it is therefore possible to identify image areas of the digital assist images in which the motion-picture film is over- or underexposed.

The over- or underexposed image areas can be highlighted visually, in particular by means of false colors or hatching in the digital assist image, or the brightness values of the pixels are assigned to predetermined brightness classes which are displayed graphically in gradated fashion, preferably in different color representations, in relief form or in topographical representation.

Since the dynamic range of a motion-picture film is very much higher than the dynamic range of an optoelectronic transducer, it is necessary, besides a different electronic amplification, also to vary the iris diaphragm in the assist optical system of the assist beam path by motor and to additionally take into account for the transfer function of the brightness the fact that there is, between the image center and the image edge, a brightness decrease on account of the beam constriction in the assist beam path or different pupil positions of the lenses used. For this purpose, the brightness relationship between the film images and the digital assist images is stored in tabular fashion in the processing unit taking account of the diaphragm setting of the assist optical system, the recording lens and the iris setting thereof or the optical components arranged in the assist beam path, and the brightness values of the pixels of the digital assist images are corrected depending on the image areas within a digital assist image taking account of the data and/or the iris setting of the camera lens used.

Furthermore, exposure values of the film images of the motion-picture film can be derived from the digital assist signals or from the assist images, such that an additional exposure meter for detecting the exposure of the film images can be obviated.

In order to extend the diaphragm stops of the brightness information obtained from the digital assist signals or assist images and thus in order to match the dynamic range of the image sensor to the very much higher dynamic range of a motion-picture film, the exposure of the image sensor is controlled by means of an assist diaphragm arranged in the assist beam path.

The exposure values of the film images can then be determined from the aperture value of the assist diaphragm, from the gain value of the gain control setting of the video assist and the level of the digital assist signals or assist images, in which case, outside a permissible level range of the digital assist signals output by the video assist, the gain value of the gain control setting of the video assist is increased or reduced until the permissible level range is reached, and/or the aperture of the assist diaphragm arranged in the assist beam path is altered until the permissible level range of the digital assist signals output by the video assist is reached.

An apparatus for carrying out the method has a camera module which is connected to the motion-picture camera and which contains an image sensor arranged in an assist beam path extracted from the film recording beam path of the motion-picture camera, and an interface and/or a controller, which, on the input side, has applied to it mirror diaphragm signals derived from the position of a rotating mirror diaphragm of the motion-picture camera and recording, control and/or status signals of the motion-picture camera and of devices connected to the motion-picture camera and is connected to an input apparatus for manual inputting of control signals and data and, on the output side, outputs control signals to the image sensor and also digital assist signals derived from the output signals of the image sensor and digital metadata derived from the recording, control and/or status signals of the motion-picture camera and also of devices connected to the motion-picture camera to a processing unit and receives control signals from the processing unit, which, on the output side, is connected to a digital network and/or outputs control signals, analog or digital video signals to at least one monitor and/or the devices connected to the motion-picture camera and/or a recording device (video recorder).

Exemplary, the processing unit comprises a personal computer or a data recording unit with a controller, and is connected, on the input side, to a camera module and, on the output side, a local area network and/or a display device that processes standardized video signals.

In order to compensate for mechanical tolerances which occur in the film camera 1, in the mirror diaphragm 11, in the elements of the beam part which passes through the first beam splitter 15 and of the assist beam path and also within the beam splitters 16 and 17 and in the assist optical system 19, which have the effect that the image is not projected into the center of the image sensor and is therefore also not projected into the center of the monitor or monitors, it is possible to use an image sensor which is larger than the image generated on the image sensor by the assist optical system. For electronic image position adjustment, the user selects, by means of the control unit, the pixels as ROI (Region of Interest) which actually comprise image information, such that although use is no longer made of all the pixels of the image sensor, the image is placed into the center of the monitor or monitors and the mechanical tolerances are thus compensated for without the image sensor itself having to be adjusted mechanically by means of an adjusting and aligning mechanism in the x and y coordinates of the plane of the video image.

In a further exemplary configuration of the apparatus according to an exemplary embodiment of the invention, the image sensor has the same dimensions as the image format of the motion-picture film.

An image sensor that matches the image format of a motion-picture film in terms of the dimensions of its sensor area makes it possible to represent the same depth of field both on the motion-picture film and on the video images particularly when no ground glass screen is arranged in the beam path of the video assist.

Furthermore, an image sensor having a sensor area matching the image format of a motion-picture film likewise enables electronic image position adjustment for compensating for mechanical tolerances which occur in the film camera 1, in the mirror diaphragm 11, in the elements of the beam part which passes through the first beam splitter 15 and of the assist beam path and also within the beam splitters 16 and 17 and in the assist optical system 19, and have the effect that the image is not projected into the center of the image sensor and therefore is also not projected into the center of the monitor or monitors.

A second set parameter of the motion-picture camera or of the camera lens is the focus setting, which can be monitored or checked with regard to complying with desired or optimum set values with the aid of the video assist. This is preferably done by means of a frequency analysis device which is contained in the processing unit and which has applied to it, on the input side, the digital assist signals and metadata and outputs, on the output side, a focusing signal to a motor controller for the driving of a servomotor coupled to the camera lens, wherein the frequency analysis device preferably comprises an FFT (Fast Fourier Transformation) analyzer integrated into the processing unit or spectral analyzer constructed according to the principle of the heterodyne receiver and outputs a display signal for the numerical or graphical display of the focus setting of the camera lens to the monitor, which is connected to a device for delimiting an image content to be imaged with maximum image sharpness for further definition of set parameters.

A further set parameter of the motion-picture camera or of the camera lens is the brightness setting, which can be monitored or checked with regard to complying with desired or optimum set values with the aid of a brightness analysis device of the video assist that is integrated into the processing unit. The brightness analysis device has applied to it, on the input side, the digital assist signals and a signal indicating the iris setting of the camera lens and outputs, on the output side, a display signal for the numerical or graphical display of the brightness and/or overexposure of regions of the digital assist images to the monitor and also an iris control signal to a motor controller for the driving of a servomotor which is connected to the assist optical system, which iris control signal opens and closes the iris diaphragm of the assist optical system during a measurement cycle.

In a further exemplary configuration of the apparatus according to an exemplary embodiment of the invention, the image sensor of the video assist can be used as a brightness sensor for detecting the exposure values of the film images since the exposure of an image sensor or CCD chip leads to a specific signal voltage in the video signal output from the image sensor, which corresponds to the function of an exposure meter according to the prior art which converts the light intensity incident via the camera lens, using a predetermined or known characteristic curve, into voltage values that are related to the incident light intensity.

In order to achieve the dynamic range of an exposure meter and to adapt the operating range of the exposure values detected by means of an image sensor to the practically relevant operating range of exposure meters according to the prior art, the aperture of the assist diaphragm contained in the assist optical system is set by means of a servomotor by the motor controller which is connected to the processing unit or is formed as part of the processing unit, and the respective aperture value of the assist diaphragm is detected by means of a diaphragm sensor and used for determining the exposure.

BRIEF DESCRIPTION OF THE DRAWINGS

The concept on which the invention is based will be explained in more detail on the basis of an exemplary embodiment illustrated in the figures, in which.

DETAILED DESCRIPTION

Figure 1:
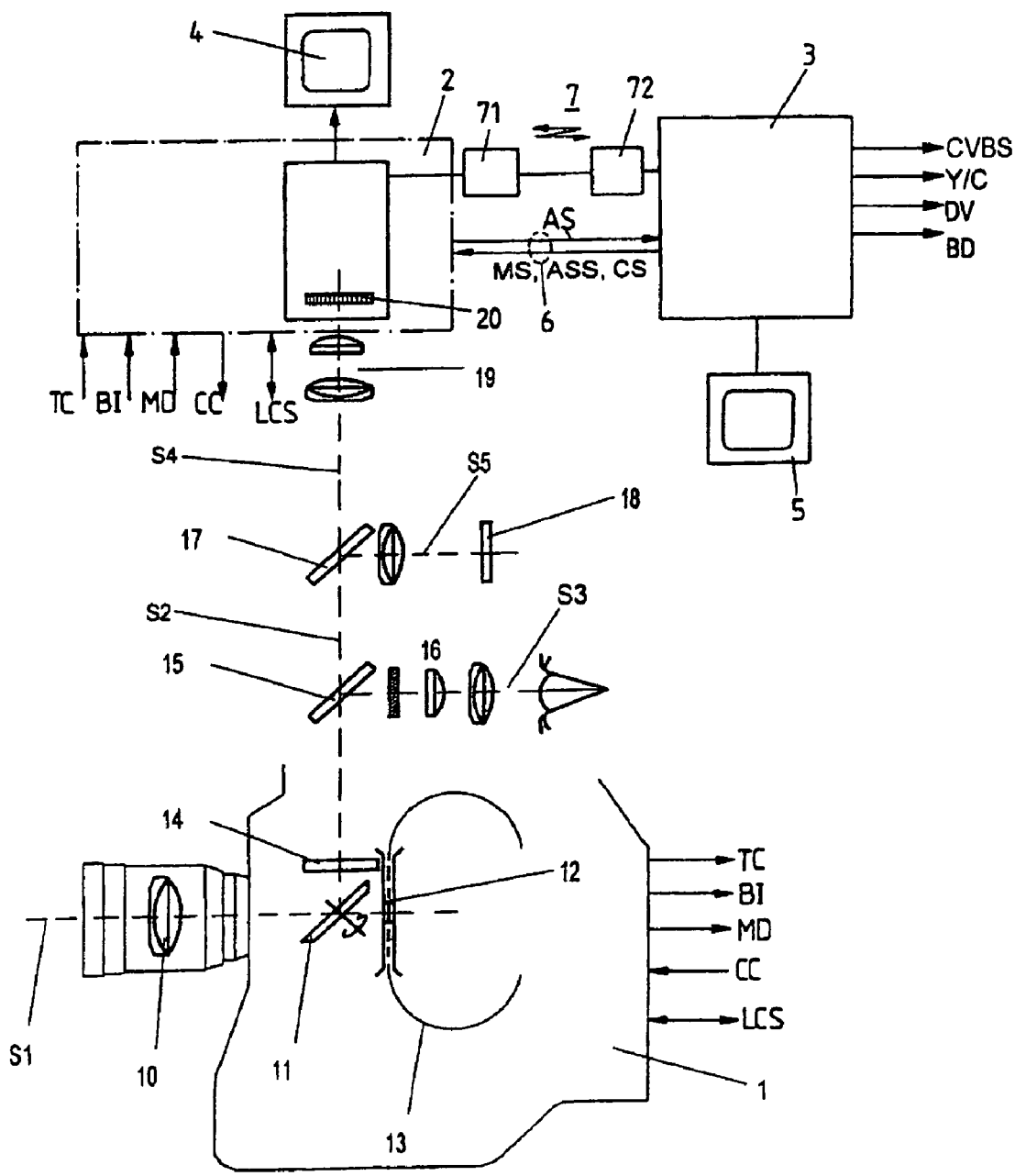
FIG. 1 shows a schematic illustration of the recording, viewfinder and assist beam path of a motion-picture camera with a camera module connected to the motion-picture camera and with a central processing unit.

The optical system illustrated schematically in FIG. 1 of a motion-picture camera 1 with a camera assist device 2, 3 shows a recording lens 10, through which a recording beam path S1 enters into the motion-picture camera 1 and impinges on a rotating mirror diaphragm 11. The rotating mirror diaphragm 11 is usually composed of a semicircular mirror surface with a circumferential angle of usually 180° and a diaphragm adjusting blade which is arranged coaxially with respect to the mirror surface and which is adjustable relative to the mirror surface, such that diaphragm aperture angles of 0° to 180° of the rotating mirror diaphragm 11 can be set.

Depending on the angular position of the rotating mirror diaphragm 11, the recording beam path S1 impinges on the opening sector (bright sector) of the rotating mirror diaphragm 11 and passes through an image window 12 onto a motion-picture film 13 guided in a film channel. During the transport of the motion-picture film 13, the image window 12 is covered by the mirror surface of the rotating mirror diaphragm 11 and the recording beam path S1 is deflected onto a ground glass screen or fiber plate 14, from where the recording beam path S1 passes through a first beam splitter 15, which splits off a viewfinder beam path S3 from the recording beam path S1 into an eyepiece 16, through which the cameraman can view the image on the ground glass screen or fiber plate 14.

The beam part S2 of the recording beam path S1 that passes through the first beam splitter 15 possibly also passes to a second beam splitter 17, which splits the beam part S2 into an exposure meter beam path S5 for an exposure meter 18 and an assist beam path S4.

The assist beam path S4 passes through an assist optical system 19 to a camera module 2 having an optoelectronic transducer or image sensor 20, which converts the optical film image into image signals. The camera module 2 furthermore receives a diaphragm index signal BI from the motion-picture camera 1, which signal corresponds to the position of the rotating mirror diaphragm of the motion-picture camera 1 with respect to the recording beam path S1 and corresponds to the respective exposure conditions of the assist beam path S4 and thus to the exposure conditions on the image sensor 20, camera status data and camera status signals or metadata MD, such as, for example, the film transport speed, information about the motion-picture film consumption, for example in the form of the signals output by a film length counter, the charge state of the accumulator, information about the camera lens in the form of the zoom, focus and/or iris setting and the like and also time code signals TC, for example in the form of a longitudinal time code (LTC).

The camera module 2 is connected to the processing unit 3, which comprises a data processing unit in the form of a personal computer or a recording unit, for example a hard disk stack with a controller or some other storage unit, for example a tape drive with controller for recording data and the construction and function of which is explained in more detail on the basis of the block diagram in accordance with FIG. 4 that is described below.

The wireless transmission device 7 comprises for example microwave transceivers 71, 72 using a spread spectrum transmitting/receiving technology, a Bluetooth or W-LAN transmission technology or the like and includes a wireless connection to operator-side control units (not specifically illustrated). In order to obtain a high data integrity, a special protocol with an automatic CRC check is used, which is adopted together with hardware technology from the radio LANs from computer technology. The devices usually operate in the frequency range of 2.4 to 2.5 GHz, which is released for unlicensed data transmission in many countries. This device technology enables reliable and operator-friendly incorporation of control computers into the camera and lens control in conjunction with a camera-specific software driver.

The camera module 2 outputs the digital assist signals AS generated from the image signals and also the recording, control and/or status signals of the motion-picture camera 1 as metadata MD to the processing unit 3 via a control and data bus 6 and receives
- control and data signals ASS, CC and LCS for the motion-picture camera 1 such as recording speed, diaphragm aperture angle of the mirror diaphragm and suchlike camera accessories connected to the motion-picture camera 1, such as, for example, desired values for the iris, zoom and focus setting of the camera lens, and
- a mode select signal MS that predetermines a desired exposure mode from the processing unit 3.

The camera module 2 also outputs camera control signals CC to the control electronics of the motion-picture camera 1 for the setting of camera and accessory desired values and enables, through the connection of a monitor 4, the assist images composed of the digital assist signals AS to be viewed directly at the camera module 2 and thus at or in direct proximity to the motion-picture camera 1.

The processing unit 3 has a plurality of outputs via which a CVBS, Y/C and DV (digital video) signal and also a signal BD containing image data are output to a local area network, a PAL or NTSC video device and to any desired storage unit.

The composite color, video, blanking and syncs signal CVBS results from the combination of luminance and chrominance signals, while the Y/C signal corresponds to the two components of luminance Y and chrominance C of the total color video signal that are transmitted separately on dedicated lines. The DV signal involves a digital recording format used in consumer video recorders or consumer camcorders.

The central processing unit 3 can optionally be connected to a monitor 5, on which the film images recorded by the motion-picture camera 1 with the camera module 2 or other control signals or data that are required for image analysis are displayed.

Figure 2:
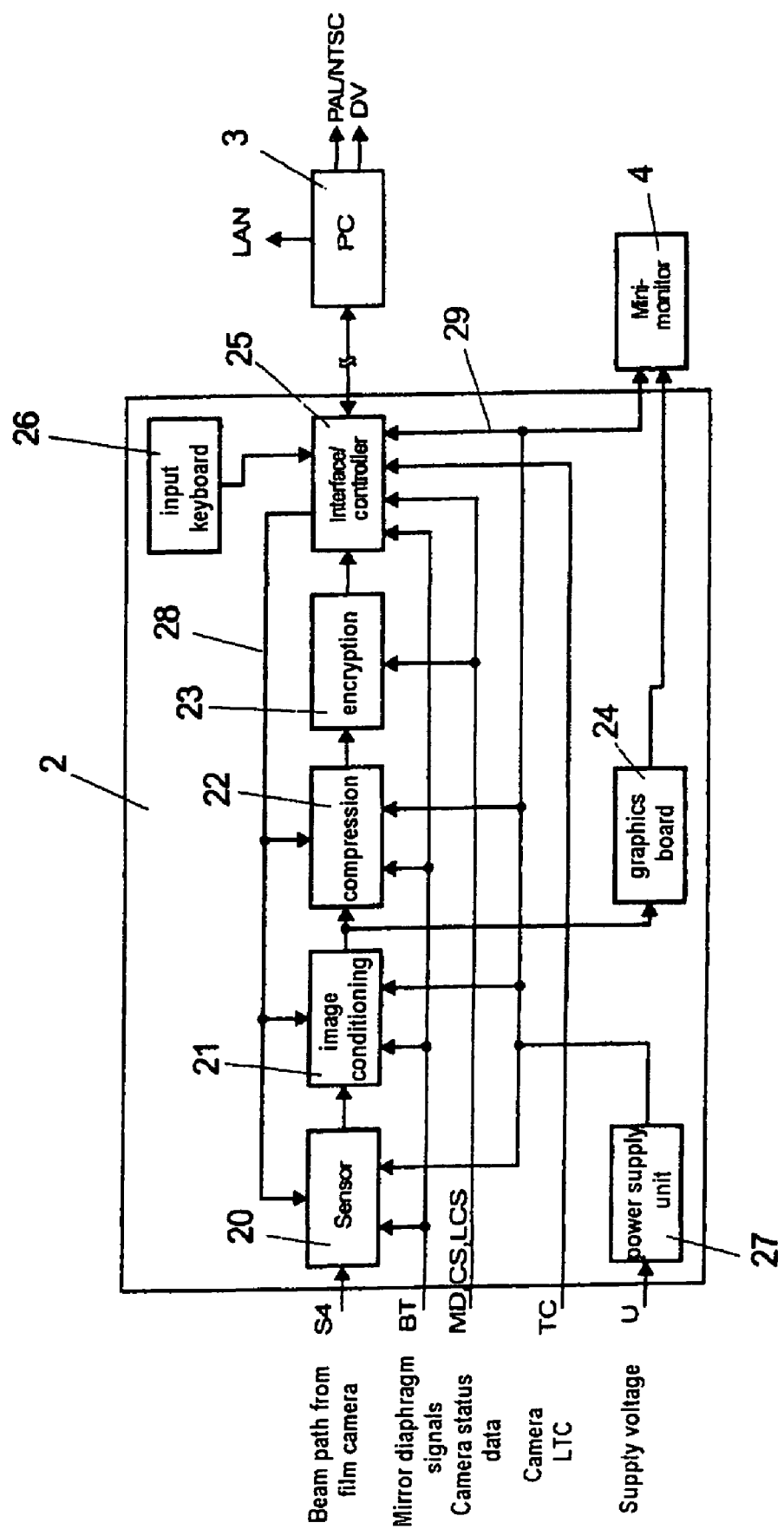
FIG. 2 shows a block diagram of the structure of the camera module in accordance with FIG. 1.

The block diagram illustrated in FIG. 2 of a camera module 2 in accordance with FIG. 1 contains the optoelectronic transducer or image sensor 20 arranged in the assist beam path S4 in accordance with FIG. 1, an image conditioning device 21, a data compression device 22, an encryption device 23, a graphics board 24, an interface/controller 25 and also an input keyboard 26 and a power supply unit 27. The diaphragm index signal BI, which is applied to an input of the camera module 2 and corresponds to the position of the rotating mirror diaphragm of the motion-picture camera, is fed to an input of the image sensor 20, of the image conditioning device 21, of the data compression device 22 and of the interface/controller 25, the necessary signal timing in each stage being adapted to the necessary conditions, or being offered ready in the controller for each of the other units. The camera status signals CS and metadata MD and also, for example, camera lens control signals LCS that are applied to a further input of the camera module 2 are fed both to the encryption device 23 and to the interface/controller 25, which additionally receives a time code signal TC, e.g. in the form of a longitudinal time code (LTC), input via a further input of the camera module 2.

A supply voltage U applied to a voltage terminal of the camera module 2 is fed to the power supply unit 27, which supplies the image sensor 20, the image conditioning device 21 and the interface/controller 25 with one or more regulated, constant voltages via a line 29.

The interface/controller 25 drives both the image sensor 20 and the image conditioning device 21 and the data compression device 22 via a control bus 28.

The encryption device 23 arranged between the data compression device 22 and the interface/controller 25 in the block diagram of the camera module 2 can alternatively also be inserted into the connection of the image conditioning device 21 to the data compression device 22. The output of the image conditioning device 21 is connected to an input of the graphics board 24, which is connected to an input of a monitor 4, which is connected to the interface/controller 25 via a signal line 29.

Figure 3:
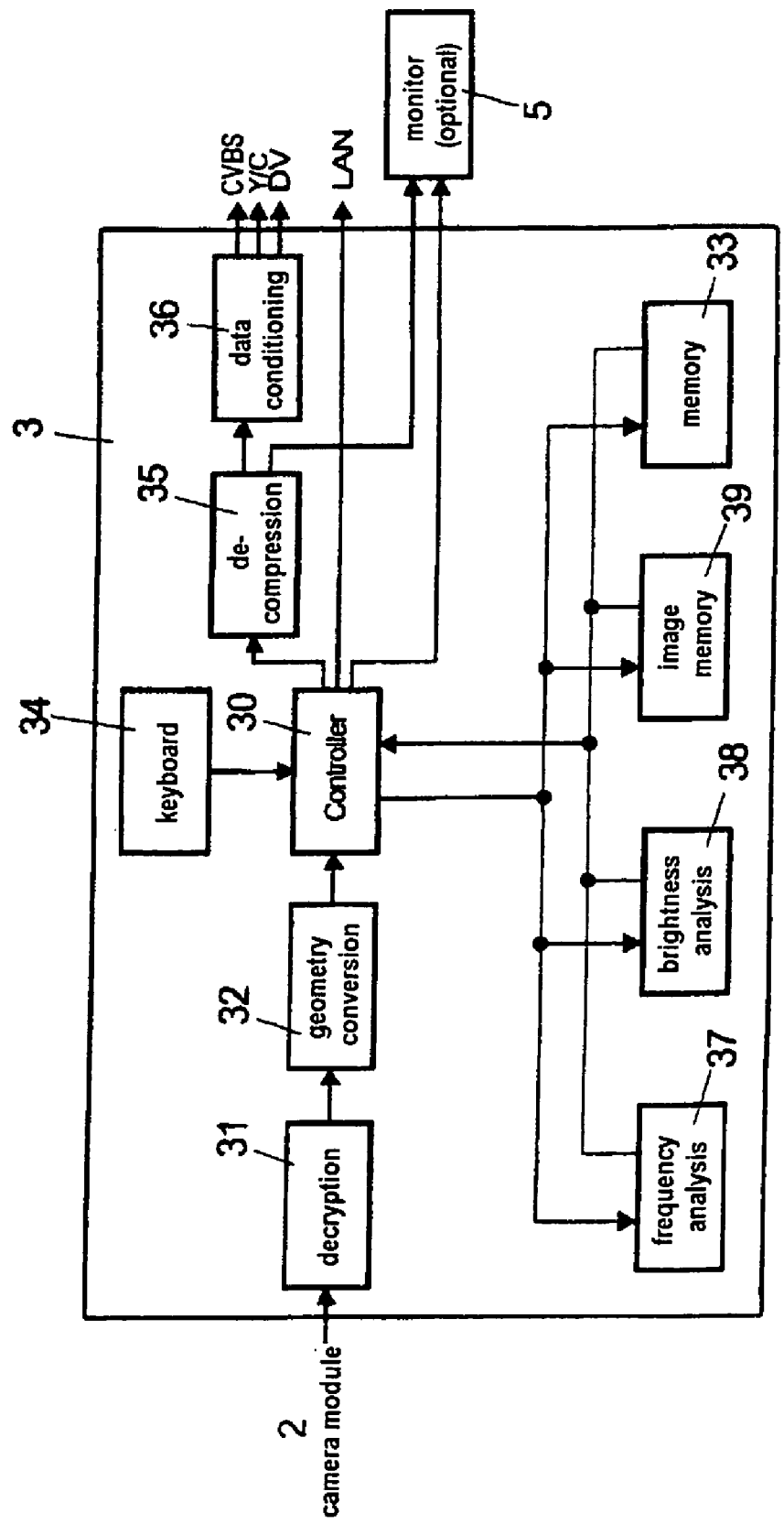
FIG. 3 shows a block diagram of the structure of the processing unit in accordance with FIG. 1.

The structure of the processing unit 3 that is illustrated as a block diagram in FIG. 3 has an input which is connected to the output of the camera module 2 in accordance with FIG. 2 and to which a decryption device 31 is connected, the output of which is connected to a geometry conversion device 32. A controller 30 is connected, on the input side, to the geometry conversion device 32, to an input keyboard 34 and also to a memory 33. Outputs of the controller 30 are connected to a decompression device 35, a local area network LAN and also to the monitor 5 which is optionally to be provided and which is connected by a further input to an output of the decompression device 35. A further output of the decompression device 35 is connected to an input of a data conditioning device 36, at the outputs of which the CVBS, Y/C and DV signals are output.

The processing unit 3 furthermore contains a frequency analysis device 37 and a brightness analysis and exposure measuring device 38 for monitoring or checking set parameters of the motion-picture camera or the camera lens, in particular for monitoring or checking focus and exposure settings, the construction and function of which are explained in more detail below with reference to FIGS. 4 and 5.

Figure 4:
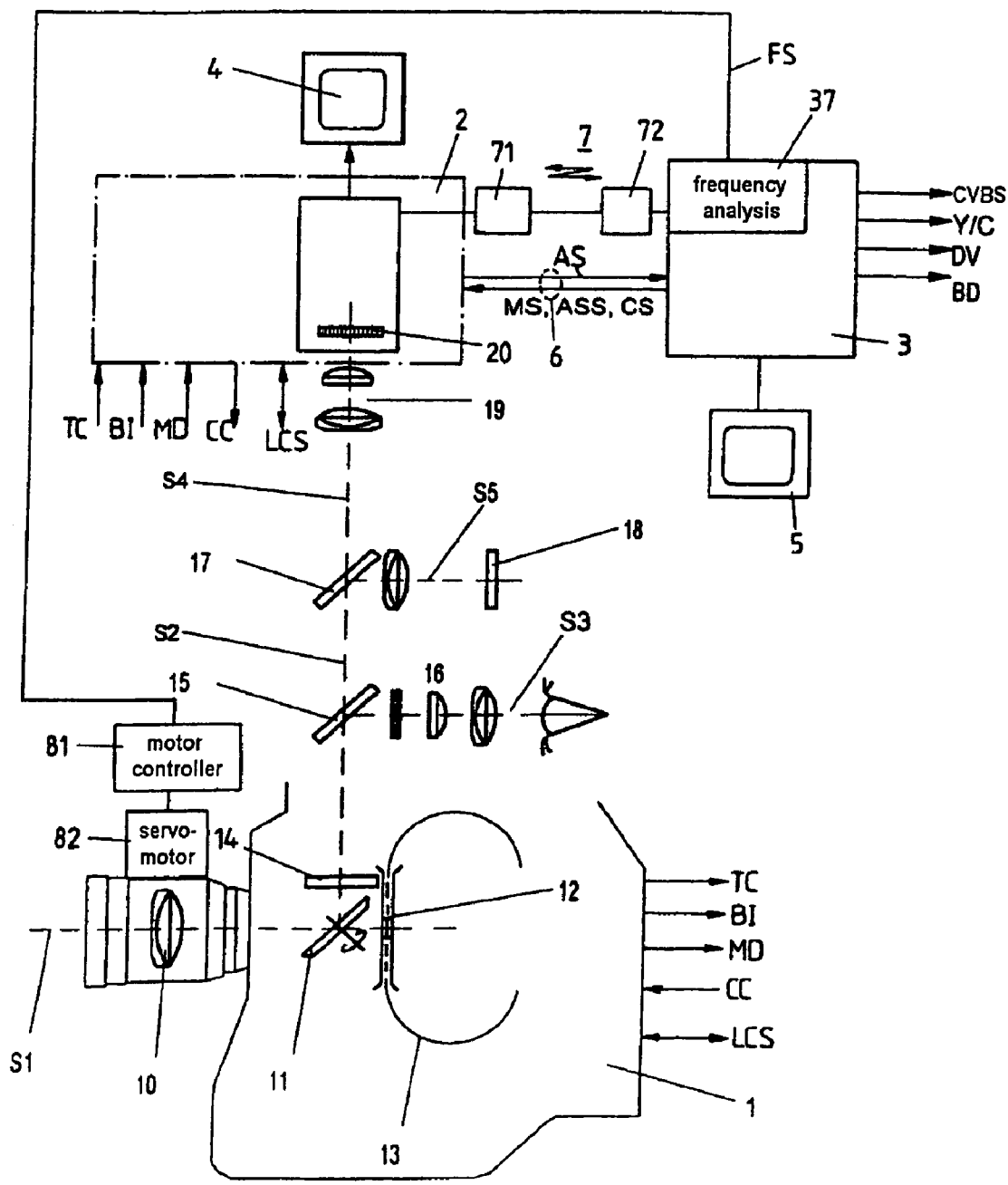
FIG. 4 shows a schematic illustration as in FIG. 1 with a frequency analysis device for the focusing of the camera lens or focus representation.

FIG. 4 shows, in a schematic illustration, the recording beam path S1, viewfinder beam path S3 and assist beam path S4 of the motion-picture camera 1 with the camera module 2 connected to the motion-picture camera 1, and the central processing unit 3, into which a frequency analysis device 37 is integrated. The frequency analysis device 37 contains a frequency or spectral analyzer, which is constructed as an FFT (Fast Fourier Transformation) analyzer or as an analyzer according to the principle of the heterodyne receiver and either calculates the frequency spectrum of a signal detected in the time domain by means of discrete Fourier transformation or, in a manner known per se, tunes the frequency band to be measured according to the present voltage level of a sawtooth generator. For this purpose, the frequency analysis device 37 has applied to it the digital assist signals AS and the metadata MD, in particular the focus setting of the camera lens 10.

For the automatic focusing of the camera lens 10 and/or for displaying the focusing setting of the camera lens 10, the frequency analysis device 37 in conjunction with the processor of the image processing unit 3 calculates the frequency distribution in a video assist image or the predetermined areas thereof and determines the sharpness setting of the camera lens 10 from the proportion of high frequencies in the digital assist image. If the camera lens 10 has been brought into focus, then a large amount of energy is found in the higher frequency ranges of the digital assist image, so that the frequency analysis device 37 can output a signal that produces a maximum with maximum focusing of the camera lens 10.

As a result of a focusing signal FS being output to a motor controller 81 for driving a servomotor 82 connected to the camera lens 10, the camera lens 10 is adjusted over the focusing setting range and the frequency analysis device 37 determines the energy in the high frequency bands of the digital assist image. The processor integrated into the processing unit 3 stores the proportions of high frequencies at the individual focusing settings and outputs a focusing signal FS to the motor controller 81, with which signal the servomotor 82 brings the camera lens 10 to the setting at which the maximum of high frequency components and hence maximum image sharpness was detected.

As an alternative or in addition, the frequency analysis device 37 outputs a display signal to the monitor 4, 5 which initiates a numerical display in the form of a numerical value or a graphical display for example in the form of a moving bar. On the basis of the numerical or graphical display, the user can run through the focus setting of the camera lens 10 and determine the maximum display value.

Provision may furthermore be made for isolating an image area that is to be sharply focused from the entire digital assist image, in which a frame is indicated around the image area on the video assist monitor for example by using a computer mouse to draw up a rectangle, within which the frequency analysis is to be effected. This ensures that the desired image area, which includes an actor, for example, and not the remaining area of the digital assist image is focused.

This method makes it possible to assess the sharpness in the predetermined region or else, if desired, an automatic or semiautomatic focusing. If, in a special case over and above this, an image sensor having the same size as the film recording format is also chosen and it is ensured that the assist optical system 19 does not limit the depth of field since it is open sufficiently wide, not only is it possible to determine the absolute focal plane but the operator also acquires the same depth of field on the assist as on the film. This enables the recorded images to be assessed very much more accurately.

Mechanical tolerances which occur in the film camera 1, in the mirror diaphragm 11, in the components of the beam part S2—which passes through the first beam splitter 15—of the recording beam path S1 and of the assist beam path S4 and also within the beam splitters 16 and 17 and in the assist optical system 19 have the effect that the image does not lie in the center of the image sensor 20 and therefore cannot be seen in the center of the monitor or monitors either. For electronic image position adjustment it is possible to use an image sensor 20 which is larger than the image generated by the assist optical system 19 on the image sensor 20, and the user, by means of the control unit 3, can select the pixels as ROI (Region of Interest) which actually comprise image information. As a result, although use is no longer made of all the pixels of the image sensor 20, the image is projected into the center of the monitor or monitors as a result of the use of such an image sensor 20 for compensating for mechanical tolerances.

Figure 5:
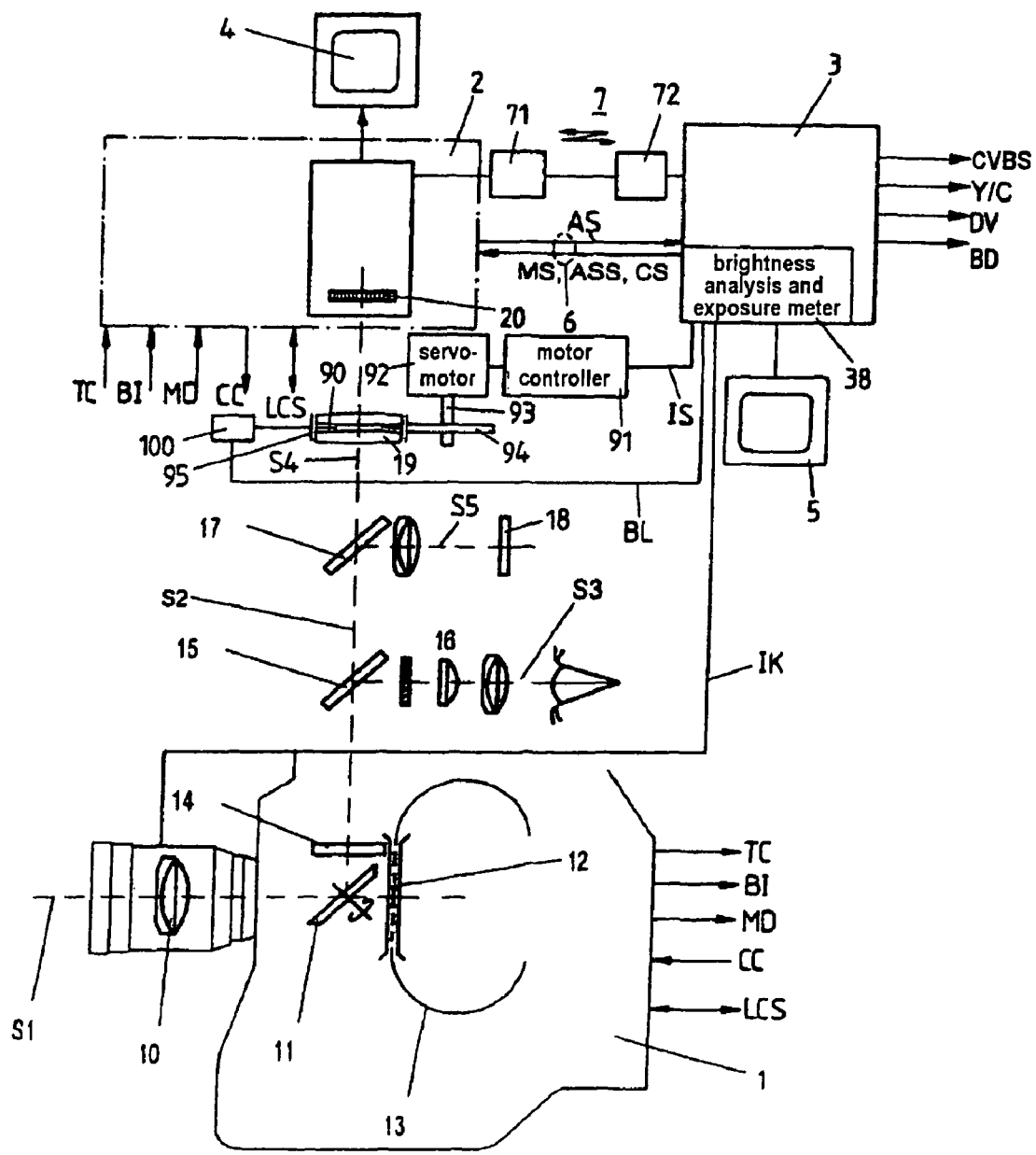
FIG. 5 shows a schematic illustration as in FIG. 1 with a brightness analysis device for determining and displaying over- and/or underexposures and for exposure metering.

FIG. 5 shows, in a schematic illustration, the recording beam path S1, viewfinder beam path S3 and assist beam path S4 of the motion-picture camera 1 with the camera module 2 connected to the motion-picture camera 1, and the central processing unit 3, into which a brightness analysis device 38 is integrated and has applied to it the digital assist signals AS and also a signal IK indicating the iris setting of the camera lens 10 and outputs, on the output side, an iris control signal IS to a motor controller 91 for driving a servomotor 92 connected to the assist optical system 19, and also a display signal to at least one of the monitors 4, 5. The brightness analysis device 38 makes it possible to determine areas in the digital assist image and hence in the film image that are over- or underexposed. By means of the known brightness relationship between the film exposure taking account of the film sensitivity, on the one hand, and the optoelectronic transducer 20, on the other hand, it is ensured that under- or overexposed areas on the motion-picture film are too dark or too bright in the digital assist image as well. In this case, the respective brightness depends on the iris diaphragm in the assist optical system 19, so that depending on the setting of the iris diaphragm in the assist optical system 19 and depending on the film type used, the under- or overexposure of specific areas in the film image can be identified if the assist image is too bright or too dark in the relevant area.

Accordingly, a relationship between the brightness on the motion-picture film and the brightness of the digital assist signals AS output by the optoelectronic transducer 20 is established from the optical components in the assist beam path S4 and the position of the iris diaphragm in the assist optical system 19 and the values derived therefrom are stored in a table store of the processing unit 3. For optimal brightness detection, the assist image is converted into a black/white image and all pixels or pixels of a selected area of the assist image are sampled with regard to their brightness. By defining upper and lower limit values for an over- and underexposure of a film image or only the upper or lower limit value, the fact of whether the relevant limit value is overshot or undershot is determined during a comparison of the brightness values of the individual pixels with at least one of the two limit values. Areas that overshoot an upper limit value therefore indicate an overexposure of the film image, while areas that undershoot a lower limit value indicate an underexposure of the film image.

Under- or overexposed areas of a film image or digital assist image can be displayed in graphical representation, for example by means of false colors or in hatched form on at least one of the monitors 4, 5. As an alternative, the normal colored assist image can be displayed and a special representation can be superimposed only on the under- or overexposed image areas.

A further alternative consists in classifying the brightness of the individual pixels into brightness classes, for example brightness of 0 to 15, 16 to 31, 32 to 47, . . . , 240 to 255, and displaying these for example 16 ranges in different color representations like on a map or as relief representation or topographical representation. From this representation, the user can visually assess the brightness distribution in the film image or digital assist image very rapidly.

Since the brightness transmission in the assist beam path S4 is not uniform because, as in all optical systems, the image corners are darker and this effect is additionally intensified by the use of specific lenses and iris settings of said lenses, provision may additionally be made for taking account of these zones of the digital assist image in the table indicating the brightness relationship between film image and optoelectronic transducer or image sensor, and for enabling a differential detection of the transfer function. These additional data are taken into account by measuring the camera lenses used and by inputting these data into the table store of the processing unit 3.

It is possible to extend the entire measurement range by opening and closing an iris diaphragm of the assist optical system 19 by motor during a measurement cycle, which is effected by corresponding driving of the motor controller 91 by means of the iris control signal IS from the brightness analysis device 38. Since the dynamic range of the film is generally greater than the dynamic range of the optoelectronic transducer 20 and the transfer function depends on the iris diaphragm of the assist optical system, the measurement range can thus be extended.

From the configuration according to the invention of the digital video assist, as a further possibility of checking or monitoring set parameters of the motion-picture camera or the camera lens, it is possible to replace the brightness sensor which, in the prior art, is connected to the motion-picture camera and is arranged in the recording beam path of the motion-picture camera and serves for detecting the exposure values of the film images, which sensor converts the light intensity incident via the camera lens, using a predetermined or known characteristic curve, into voltage values related to the incident light intensity.

Since the video assist is provided with an electronic amplification of the video image in the form of a gain control which is integrated into the image sensor or connected downstream of the image sensor and serves to convert the exposure of the image sensor into an optimum modulation of the assist signals or assist images output by the video assist, in a further configuration of the solution according to the invention, exposure values can be derived from the video image. When a video camera is used, the exposure of an image sensor or CCD chip leads to a specific signal voltage in the video signal output by the image sensor, such that, under specific preconditions, the signal voltage of the assist signals output by the video assist can be used for exposure detection and an additional exposure meter for detecting or defining the exposure of the film images can be obviated.

Although the characteristic curve used to convert the light intensity incident on the image sensor into voltage values depends on the setting of the gain control of the image sensor or of an amplifier connected downstream of the image sensor, since this setting is known it is possible for the exposure values to be determined therefrom.

Despite the settable signal gain of an image sensor or a video camera, however, owing to the smaller dynamic range of an image sensor in comparison with an exposure meter according to the prior art, the use of the image sensor or the video camera as an exposure meter is not readily possible for the following reason.

The dynamic range of customary exposure meters comprises up to 18 diaphragm stops, while the brightness information to be obtained from a video signal comprises only approximately 6 diaphragm stops depending on various factors. By means of the information obtained from the assist signals output by the image sensor or video camera, the dynamic range can be extended again by approximately 6 further diaphragm stops through corresponding setting of the gain value of the gain control, such that it is possible to detect exposure values over a total of approximately 12 diaphragm stops. However, even this dynamic range does not suffice to compensate for all exposure conditions relevant in practice.

In order to adapt the operating range of the exposure values detected by means of an image sensor to the practically relevant operating range of exposure meters according to the prior art, therefore, in accordance with FIG. 5, an assist diaphragm 90 is arranged in the assist optical system 19, to which assist diaphragm is fitted a gear ring 95 that drives the assist diaphragm 90. An external controller 91 for the assist diaphragm 90 acts on the gear ring 95 via a drive wheel 94 connected to a motor shaft 93 of a servomotor 92. In addition, the assist diaphragm 90 is connected to a sensor 100, which detects the diaphragm aperture of the assist diaphragm 90 and outputs a diaphragm aperture signal BL to the processing unit 3.

By means of the arrangement illustrated in FIG. 5, the exposure values for the exposure of the motion-picture film can be determined from the video assist as follows.

If the output level of the assist signals is within a predetermined valid operating range, then the exposure can be determined from the aperture value of the assist diaphragm, which is known from the sensor value output by the sensor 100 to the processing unit 3, from the gain value of the gain control setting and also from the level of the assist signals.

If the output signal of the video assist lies outside the predetermined permissible operating range, then the exposure can be determined in the abovementioned manner after the gain setting has been increased or reduced until the permissible operating range has been reached.

If exposure conditions are present which do not produce a video signal within the limits of the permissible operating range even by alteration of the gain setting, then the assist diaphragm 90 is opened wider or closed by means of the motor controller 91 and the servomotor 92. Consequently, by altering the gain setting of the image sensor and by adjusting the assist diaphragm 90, it is possible to determine the video assist in a sufficiently large exposure range of exposure values for the exposure of the motion-picture film, such that an additional exposure meter can be dispensed with.

The invention claimed is:

1. A method for monitoring set parameters of a motion-picture camera such as focus, brightness and exposure settings with film images which are extracted from a recording beam path of the motion-picture camera and which are converted into digital assist signals by an optoelectronic transducer arranged in an assist beam path of the motion-picture camera, said assist beam path being interrupted periodically depending on an image recording frequency of the motion-picture camera, which digital assist signals are output to a processing unit with an image frequency matching the image recording frequency of the motion-picture camera or with an assist image frequency, to which processing unit recording, control and/or status signals of the motion-picture camera or of devices connected to the motion-picture camera are additionally fed as metadata, wherein the processing unit analyzes digital assist images composed of the digital assist signals and outputs digital output data and control signals to control modules of the motion-picture camera and/or to a network, and/or as analog or digital video signals to a monitor connected to the processing unit, wherein the processing unit analyzes a frequency distribution in the digital assist images that are composed of the digital assist signals and reproduce the film images during a variation of the focusing of the camera lens, determines the proportion of high frequencies in different focus settings and sets a focus of the camera lens to a value at which a digital assist image has a maximum of high frequencies.

2. The method of claim 1, wherein the camera lens is adjusted over a focusing range, the digital assist images are coupled to metadata of each focus setting and an energy of high frequency bands of each digital assist image is determined and the determined values are temporarily stored or displayed.

3. The method of claim 2, wherein the temporarily stored values are compared with one another and the focus of the camera lens is set to a value at which the energy of the high frequency bands of the digital assist image is maximum.

4. The method of claim 2, wherein the determined values are represented numerically or graphically on a monitor connected to the processing unit.

5. The method of claim 1, wherein the processing unit analyzes a brightness of the digital assist images that are composed of the digital assist signals and correspond to film images taking account of a brightness relationship between the film images and the digital assist images.

6. The method of claim 5, wherein a brightness of pixels of the digital assist images is compared with at least one predetermined limit value, and in that an under- or overexposure signal is output if the pixels of an image area of the digital assist image undershoot or overshoot the at least one predetermined limit value.

7. The method of claim 5, Wherein the digital assist images are converted into black/white images and a brightness of pixels of the digital assist images is analyzed.

8. The method of claim 7, wherein an under- or overexposed image area is highlighted visually by means of false colors or hatching in the digital assist image.

9. The method of claim 7, wherein brightness values of the pixels are assigned to predetermined brightness classes which are displayed graphically in gradated fashion in relief form or in topographical representation.

10. The method of claim 5, wherein the brightness relationship between the film images and the digital assist images is stored in tabular fashion in the processing unit taking account of the diaphragm setting of the assist optical system or the optical components arranged in the assist beam path.

11. The method of claim 5, wherein the brightness values of the pixels of the digital assist images are corrected depending on the image areas within a digital assist image taking account of data and/or the iris setting of the camera lens used.

12. The method of claim 5, wherein an iris diaphragm of the camera lens used is altered in order to extend a measurement or analysis range during a measurement or analysis cycle.

13. The method of claim 1, wherein exposure values of the film images of the motion-picture film are derived from the digital assist signals or assist images.

14. The method of claim 13, wherein an exposure of the image sensor is controlled by means of an assist diaphragm arranged in the assist beam path.

15. A method for monitoring set parameters of a motion-picture camera such as focus, brightness and exposure settings with film images which are extracted from a recording beam path of the motion-picture camera and which are converted into digital assist signals by an optoelectronic transducer arranged in an assist beam path of the motion-picture camera, said assist beam path being interrupted periodically depending on an image recording frequency of the motion-picture camera, which digital assist signals are output to a processing unit with an image frequency matching the image recording frequency of the motion-picture camera or with an assist image frequency, to which processing unit recording, control and/or status signals of the motion-picture camera or of devices connected to the motion-picture camera are additionally fed as metadata, wherein the processing unit analyzes digital assist images composed of the digital assist signals and outputs digital output data and control signals to control modules of the motion-picture camera and/or to a network, and/or as analog or digital video signals to a monitor connected to the processing unit, and wherein the exposure values of the film images are determined from an aperture value of an assist diaphragm, from a gain value for gain control setting of a video assist and a level of the digital assist signals or assist images.

16. The method of claim 15, wherein outside a permissible level range of digital assist signals output by the video assist, the gain value of the gain control setting of the video assist is increased or reduced until the permissible level range is reached.

17. The method of claim 16, wherein the aperture of the assist diaphragm Which is arranged in the assist beam path is altered until the permissible level range of the digital assist signals output by the video assist is reached.

18. An apparatus for carrying out a method for monitoring set parameters of a motion-picture camera such as focus, brightness and exposure settings with film images which are extracted from a recording beam path of the motion-picture camera and which are converted into digital assist signals by an optoelectronic transducer arranged in an assist beam path of the motion-picture camera, said assist beam path being interrupted periodically depending on the image recording frequency of the motion-picture camera, which digital assist signals are output to a processing unit with an image frequency matching an image recording frequency of the motion-picture camera or with an assist image frequency, to which processing unit recording, control and/or status signals of the motion-picture camera or of devices connected to the motion-picture camera are additionally fed as metadata, wherein the processing unit analyzes digital assist images composed of the digital assist signals and outputs digital output data and control signals to control modules of the motion-picture camera and/or to a network, and/or as analog or digital video signals to a monitor connected to the processing unit, the apparatus comprising, a camera module which is connected to the motion-picture camera and which contains an image sensor arranged in an assist beam path extracted from the recording beam path of the motion-picture camera, and an interface and/or a controller, which, on the input side, has applied to it mirror diaphragm signals derived from a position of a rotating mirror diaphragm of the motion-picture camera and recording, control and/or status signals of the motion-picture camera and of devices connected to the motion-picture camera and is connected to an input apparatus for manual inputting of control signals and data and, on the output side, outputs control signals to the image sensor and also digital assist signals derived from the output signals of the image sensor and digital metadata derived from the recording, control and/or status signals of the motion-picture camera and also of devices connected to the motion-picture camera to a processing unit and receives control signals from the processing unit, which, on the output side, is connected to a digital network and/or outputs control signals, analog or digital video signals to at least one monitor and/or the devices connected to the motion-picture camera and/or a recording device.

19. The apparatus of claim 18, wherein the processing unit comprises a personal computer or a data recording unit with a controller, and is connected, on the input and output side, to a camera module and, on the output side, a local area network and/or a display device that processes standardized video signals.

20. The apparatus of claim 18, wherein the image sensor is larger than the image generated on the image sensor by an assist optical system.

21. The apparatus of claim 18, wherein the image sensor has the same dimensions as the image format of a motion-picture film in said motion picture camera.

22. The apparatus of claim 18, wherein the processing unit contains a frequency analysis device, which has applied to it, on the input side, the digital assist signals and metadata and outputs, on the output side, a focusing signal to a motor controller for driving a servomotor coupled to the camera lens.

23. The apparatus of claim 22, wherein the frequency analysis device comprises an FFT analyzer integrated into the processing unit or a. spectral analyzer constructed according to the principle of a heterodyne receiver.

24. The apparatus of claim 22, wherein the frequency analysis device outputs a display signal for the numerical or graphical display of a focus setting of the camera lens to the monitor.

25. The apparatus of claim 18, wherein the monitor is connected to a device for delimiting an image content to be imaged with maximum image sharpness.

26. The apparatus of claim 18, wherein the processing unit contains a brightness analysis device, which has applied to it, on the input side, the digital assist signals and a signal indicating an iris setting of the camera lens and outputs, on the output side, a display signal for a numerical or graphical display of the brightness and/or overexposure of regions of the digital assist images to the monitor.

27. The apparatus of claim 26, wherein the brightness analysis device outputs, on the output side, an iris control signal to a motor controller for driving a servomotor which is connected to an assist optical system, which iris control signal opens and closes an iris diaphragm of the assist optical system.

28. The apparatus of claim 27, wherein the assist optical system contains an assist diaphragm, an aperture of which can be set by means of the servomotor by the motor controller which is connected to the processing unit or is formed as part of the processing unit.

29. The apparatus of claim 28, wherein a motor shaft of the servomotor is connected to a drive wheel which meshes with a gear ring connected to the assist diaphragm.

30. The apparatus of claim 28, further comprising a diaphragm sensor which is connected to the assist diaphragm and detects an aperture value of the assist diaphragm.

31. An apparatus for carrying out a method for monitoring set parameters of a motion-picture camera comprising, a camera module which is connected to the motion-picture camera and which contains an image sensor arranged in an assist beam path extracted from a recording beam path of the motion-picture camera, and an interface and/or a controller, which, on the input side, has applied to it mirror diaphragm signals derived from a position of a rotating mirror diaphragm of the motion-picture camera and recording, control and/or status signals of the motion-picture camera and of devices connected to the motion-picture camera and is connected to an input apparatus for manual inputting of control signals and data and, on the output side, outputs control signals to the image sensor and also digital assist signals derived from the output signals of the image sensor and digital metadata derived from the recording, control and/or status signals of the motion-picture camera and also of devices connected to the motion-picture camera to a processing unit and receives control signals from the processing unit, which, on the output side, is connected to a digital network and/or outputs control signals, analog or digital video signals to at least one monitor and/or the devices connected to the motion-picture camera and/or a recording device.

32. A method for monitoring set parameters of a motion-picture camera such as focus, brightness and exposure settings with film images which are extracted from a recording beam path of the motion-picture camera and which are converted into digital assist signals by an optoelectronic transducer arranged in an assist beam path of the motion-picture camera, said assist beam path being interrupted periodically depending on an image recording frequency of the motion-picture camera, which digital assist signals are output to a processing unit with an image frequency matching the image recording frequency of the motion-picture camera or with an assist image frequency, to which processing unit recording, control and/or status signals of the motion-picture camera or of devices connected to the motion-picture camera are additionally fed as metadata, wherein the processing unit analyzes digital assist images composed of the digital assist signals and outputs digital output data and control signals to control modules of the motion-picture camera and/or to a network, and/or as analog or digital video signals to a monitor connected to the processing unit, wherein the exposure values of the film images are determined from an aperture value of an assist diaphragm, from a gain value for gain control setting of a video assist and a level of the digital assist signals or assist images, and wherein the processing unit analyzes a brightness of the digital assist images that are composed of the digital assist signals and correspond to film images taking account of a brightness relationship between the film images and the digital assist images.

33. An apparatus for monitoring set parameters of a motion-picture camera such as focus, brightness and exposure settings with film images which are extracted from a recording beam path of the motion-picture camera and which are converted into digital assist signals by an optoelectronic transducer arranged in an assist beam path of the motion-picture camera, said assist beam path being interrupted periodically depending on the image recording frequency of the motion-picture camera, which digital assist signals are output to a processing unit with an image frequency matching an image recording frequency of the motion-picture camera, to which processing unit recording, control and/or status signals of the motion-picture camera or of devices connected to the motion-picture camera are additionally fed as metadata, wherein the processing unit analyzes digital assist images composed of the digital assist signals and outputs digital output data and control signals to control modules of the motion-picture camera and/or to a network, and/or as analog or digital video signals to a monitor connected to the processing unit, the apparatus comprising, a camera module which is connected to the motion-picture camera and which contains an image sensor arranged in an assist beam path extracted from the recording beam path of the motion-picture camera, and an interface and/or a controller, which, on the input side, has applied to it mirror diaphragm signals derived from a position of a rotating mirror diaphragm of the motion-picture camera and recording, control and/or status signals of the motion-picture camera and of devices connected to the motion-picture camera and is connected to an input apparatus for manual inputting of control signals and data and, on the output side, outputs control signals to the image sensor and also digital assist signals derived from the output signals of the image sensor and digital metadata derived from the recording, control and/or status signals of the motion-picture camera and also of devices connected to the motion-picture camera to a processing unit and receives control signals from the processing unit, which, on the output side, is connected to a digital network and/or outputs control signals, analog or digital video signals to at least one monitor and/or the devices connected to the motion-picture camera and/or a recording device.

\* \* \* \* \*